May 27, 1969
L. M. JONES
3,446,525
SANITARY PICKUP DEVICE FOR ANIMAL DROPPINGS
AND LIKE MATERIAL
Filed June 9, 1967
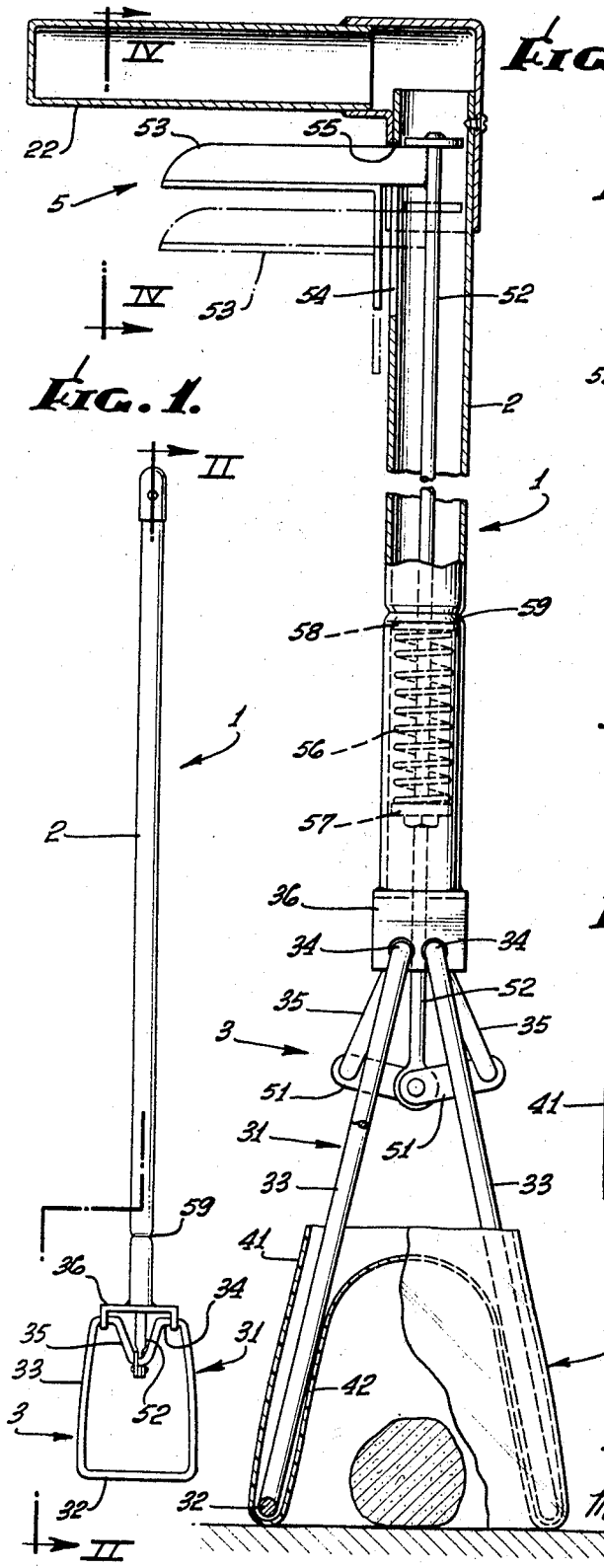
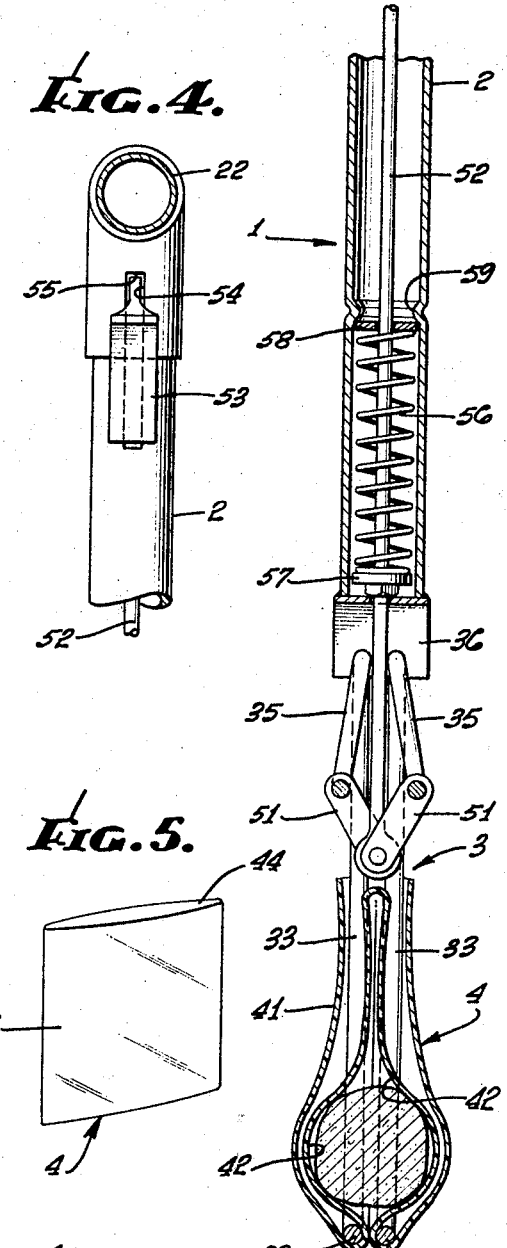
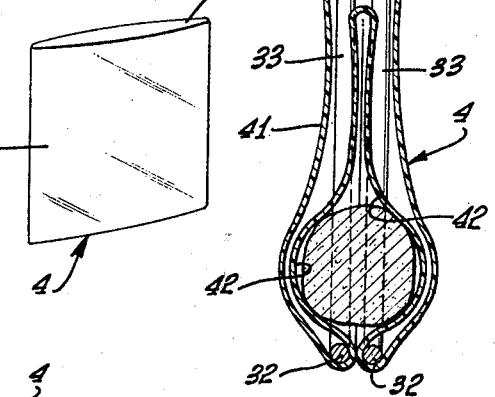
INVENTOR.
LAWRENCE M. JONES
BY
Mikella, Glenny, Pomz & Smith
ATTORNEYS.

United States Patent Office 3,446,525
Patented May 27, 1969

---

3,446,525
SANITARY PICKUP DEVICE FOR ANIMAL DROPPINGS AND LIKE MATERIAL
Lawrence M. Jones, 999 E. Valley, Apt. 56,
Alhambra, Calif. 91801
Filed June 9, 1967, Ser. No. 644,920
Int. Cl. A47f 13/06; B66c 1/10
U.S. Cl. 294—19                              3 Claims

ABSTRACT OF THE DISCLOSURE

A sanitary and convenient portable pickup device for animal droppings and like unclean material which includes an elongated body that carries a pickup means at its lower end. The pickup means includes a pair of virtually rectangular open wire frame pickup members that are movable toward and away from one another by control means operable from the upper end of the body. The members are adapted to releasably support a disposable wrapper in the form of an inverted bag having opposed compliant panel or sheet portions positioned between the pickup members to sealingly enclose or wrap animal droppings or the like (by expanding outwardly through the open frame members) when the members are brought together and to subsequently release the droppings. The used bag may be readily removed from the members and replaced with a fresh bag.

---

It is often desirable to have a clean, sanitary device for picking up unclean material such as droppings from dogs, cats, etc., for transporting the material to a convenient disposal place, such as a garbage can, and for depositing the material in the can.

In addition to the desirability of keeping lawns, parkways, walks and the like clean of such material which may present a health hazard, there may be laws or ordinances requiring the owner of an animal to perform such cleanup or there may be such requirements in leases or in condominum agreements.

It is particularly desirable to be able to accomplish such cleanup in a sanitary manner without contaminating or getting such material on the user's hands or clothing, or on the permanent parts of the pickup device.

Prior devices generally involved pushing or scraping the material into some permanent container or receptacle, such as a pan or cup, either with an additional tool or by scooping the material with the receptacle itself. This invariably resulted in the receptacle and/or the tool becoming contaminated by the material and requiring that it be cleaned immediately to avoid an unsanitary condition created by merely storing the device.

Further, prior devices generally required the user to bend down to ground level, which is inconvenient and uncomfortable, particularly for older people, people with back problems, etc. In addition, prior devices required great care in transporting the material to avoid dropping it, and often they would not readily permit picking up a second load of material without first being unloaded.

The present invention contemplates a convenient sanitary portable pickup and transporting device for unclean material such as animal droppings and like which permits the user to grasp the material in a disposable wrapper means supported on the device for ready removal and replacement by a fresh wrapper means. In a preferred form, the wrapper may be baglike: an inverted bag can be placed between open frame pickup members and the marginal portions of the bag turned over the bottom edges of the members so that when the members are then moved together about a body of material to be collected, the material is retained in sealed condition within the bag and does not touch the members or other parts of the device. The bag being of compliant material may thereby extend outwardly through the open frame members. The members may again be moved apart to release the collected material, and the disposable wrapper may also be removed from the device without touching the portion which contacted the unclean material.

In a preferred form, the device may be manually remotely controlled from the upper end of an elongated body portion to obviate the necessity of bending over to collect the material and be biased into closed position to facilitate carrying the picked up and wrapped object to a place of disposal.

Accordingly, it is an object of the present invention to provide a novel and improved, convenient and sanitary portable device for pickup and transportation of unclean material such as animal droppings and the like.

It is another object of the present invention to provide such a device which utilizes a readily separable and replaceable, disposable wrapper means.

It is another object of the present invention to provide such a device which is conveniently operable by a person standing in an upright position to pick up unclean material lying on the ground.

It is a further object of the present invention to provide such a device which is simple and economical to manufacture and which may utilize inexpensive materials for the disposable wrapper means.

A specific object of the invention is to provide a self-bagging portable pickup device utilizing available plastic type bags of a standard size and operable to envelope an article to be picked up, to bag the article, and to release the bag with the enclosed article by manipulation of the pickup device and without touching or manual handling of the bag.

Other objects and advantages of the present invention will become more apparent from the following description and the associated drawings.

In the drawings:

FIG. 1 is a front view of a device for picking up and transporting animal droppings and like material, which embodies features of the present invention. The device is shown without disposable wrapper means with which it is used.

FIG. 2 is an enlarged side view, with portions in section, taken generally along the plane II—II of FIG. 1, showing the device in its open actuated condition and with disposable wrapper means in the form of a bag supported on the device. The actuating lever is also shown in broken lines when in its non-actuated position.

FIG. 3 is a fragmentary vertical section similar to the lower portion of FIG. 2, showing the device in its closed condition.

FIG. 4 is a transverse vertical section taken generally along the plane IV—IV of FIG. 2.

FIG. 5 is a perspective view, reduced in size relative to FIGS. 2 to 4, of an exemplary wrapper bag for the device.

Briefly, the illustrated device 1 for picking up bagged or wrapped droppings, transporting and depositing without touching the droppings and like unclean material includes an elongated body portion 2 carrying pickup means 3 at its lower end. The pickup means 3 includes a pair of movable open frame pickup members 31 adapted to carry for ready removal and replacement a sanitary disposable wrapper 4 which may comprise a bag 41 having a pair of compliant opposed impervious panel or sheet portions 42 for enveloping and holding the material to be collected in sealed condition. The pickup means 3 may be manually operable from the upper end of the body portion 2 by control means 5.

Now considering the illustrated device 1 in further detail, the body portion 2 is an elongated hollow tube having a transversely extending hand-grip portion 22 at its upper end. The body portion 2 may be constructed of any suitable material such as steel tubing, aluminum tubing, or extruded plastic tubing. The length of the body portion 2 may be such that the overall length of the device permits the user to hold the hand-grip portion 22 in one hand and to conveniently reach ground level without bending or stooping. If desired, the length may be variable or adjustable to accommodate persons of different height and for use by children.

The pickup means 3, which is operable to grasp or pick-up, hold, and subsequently release the dog droppings and like unclean material, is carried at the lower end of the elongated body. The illustrated pickup means 3 includes the two frame pickup or clamping members 31 which are pivotally supported at their upper ends for movement of their lower portions toward and away from one another. The pickup members may take various selected forms, sizes, configurations or shapes. The pickup members 31 may be conveniently formed from a metal rod or wire that is bent or formed into a virtually rectangular, open configuration shown in FIG. 1. Each pickup member 31 has a bottom portion 32, a pair of spaced upright side portions 33, and a top portion that is bent or formed at its center in a downward and somewhat outward U-shape to provide an integral control lever or crank section or arm 35 which is downwardly and outwardly displaced. A pivot section 34 is thereby provided at either side of the crank arm 35. As shown best in FIG. 1, each pickup member 31 is pivotally mounted at the pivot sections 34 on the depending arms of a head or U-bracket 36 which is secured as by means of welding to the lower end of the body portion 2. The two pickup members are thus pivotally mounted on parallel axes.

The control means 5 of the device control the movement of the pickup members 31 between an open position as shown in FIG. 2 and a closed holding or retaining position as shown in FIG. 3. Various suitable mechanisms may be utilized.

The drawings show a simple and effective control arrangement which resiliently urges the pickup members 31 to the closed position and is easily and conveniently operated from the upper end of the handle 2 to move the pickup members to the open position to receive and subsequently release dog droppings and the like. As shown best in FIGS. 2 and 3, the crank arms 35 of the pickup members 31 are pivotally interconnected by a toggle made up of a pair of short links 51 that are pivotally connected to the lower end of a vertically reciprocating actuating or control rod 52 which extends upwardly through the head 36 (attached to the lower end of body 2) and the tubular body portion 2. The upper end of the rod 52 supports a transversely extending actuating or control trigger or lever 53 adjacent to the upper end of the body for manual manipulation. The lever 53 extends outwardly through a vertical slot 54 in the wall of the body, lying a short distance below and generally parallel to the hand-grip portion 22. The upper edge of the slot 54 forms a stop 55 to limit upward movement of the control rod 52.

The pickup members 31 may be biased to the closed position shown in FIG. 3 for automatically holding in a bag or retaining material which has been picked up by the device. In the illustrated construction, the control rod 52 is urged downwardly to position the members 31 in the closed position by a coil spring 56 disposed around the rod 52 and within the lower end of the body 2. The spring 56 exerts downward pressure on the rod 52 through a lower washer 57 supported on the rod 52 as by means of a nut. The body 2 may be dented or crimped inwardly at 59 to limit upward movement of an upper washer 58 to in turn restrain the upper end of the coil spring 56. When the pickup members 31 are in the closed position shown in FIG. 3 the trigger 53 is in the lower biased position as shown in broken line in FIG. 2. To open the pickup members 31, the user holds the hand-grip portion 22 and pulls the trigger 53 to the upper position shown in FIG. 2 in solid line, which compresses the spring 56 and pivots the pickup members through the crank arms 35 and the toggle links 51 to the open position shown in FIG. 2.

Sanitary, readily disposable and replaceable wrapper or holding means 4 are releasably positioned on the pickup members 31 for use in grasping or picking up, holding, transporting, and disposing of animal droppings and like unclean material. It is desirable that the wrapper means 4 be securely retained on the device during its operation to grasp, hold and transport material, but that the wrapper means be readily removable from the device when it is desired to dispose of it and/or replace it with a fresh wrapper means. Further, it is desirable that the other portions of the device be adequately covered and isolated from the unsanitary material which is picked up and handled to obviate the necessity of cleaning those other portions after the device has been used and the wrapper means thrown away.

One convenient form of wrapper means 4 which may be used comprises a plastic, cloth, or paper bag or receptacle 41 having thin, compliant impervious walls. The illustrated bag 41 may be so assembled on the pickup members 31, as shown in FIGS. 2 and 3, that the walls of the bag are doubled over each member and the portions of the walls that are thereby positioned inwardly of the respective members comprise the inner wrapper panel or sheet portions 42 which enclose the material.

More particularly, such a bag 41 is illustrated in FIG. 5 in condition. The bag 41 has a pair of rectangular walls and an opening 44 at one end. Bags may be made of tubular stock, heat sealed along one transverse edge, or of the conventional rectangular-bottom form. The bag may be placed in inverted position with its bottom between the diverging pickup members, and marginal portions folded back upwardly over bottom frame portions 32 so that all lower surfaces of the pickup members are covered by the bag. If preferred, the pickup members 31 may be extended into the bag through its opening 44 and the lower portion of the bag may be doubled inverted or folded upwardly between the bottom portions 32 of the members. The bag, when so assembled on the pickup device, forms a downwardly opening cavity defined by the opposed compliant pair of wrapper panel portions 42. Each of the panel portions 42 lies inwardly of and extends across one of the open pickup members 31.

As shown in FIG. 3, when the members 31 are closed, the bottom portions 32 clamp together in tight frictional contact with adjacent sections of the panel portions 42 therebetween to retain stool within the bag wrapper. Thus, the bag completely encloses the collected stool. By virtue of the open frame construction of the members 31 and the arrangement of bag 41 therewith, the compliant wrapper panel portions may extend or expand outwardly through one of the open frame pickup members 31 to hold the collected material. In this connection, it will be noted that the illustrated exemplary bag 41 permits ample movement and shifting of portions of the compliant bag to hold collected material without falling from the device because of the tight frictional relation of bottom wire portions 32.

To use the device, the trigger 53 is pulled to open the pickup members 31 as described above and the members and the panel portions 42 of the bag are positioned over and on opposite sides of the material to be collected in a manner generally as shown in FIG. 2. When the trigger 53 is released, the spring 56 will cause the members to move closely along the ground beneath the stool and to close against each other, and the stool will thereby be slightly raised and enclosed within the panel portions 42 of the bag. The device may then be raised at an angle to shift the stool within the bag to one side and through one of the open frame members.

To pick up a second body of material and with the first stool in the bag at one side of the members, the device may again be opened and closed on the second load without dropping the first load. Before shifting of the first stool in the bag it would also be possible to deposit the first stool in close proximity to a second stool and then grasp two stools simultaneously.

The spring 56 acts to keep the pickup members 31 closed, with their lower portions in contact, to retain the bag as well as the collected material supported on the device, and for transportation of the material to a suitable place where it can be deposited. The pickup members are then simply opened to deposit the collected material, and the bag may be readily slid off of the pickup members as by shaking the device and discarded. This may also be accomplished by only handling the outside top portions of the bag and thereby never touching the inside portions of the bag which come in contact with the collected unclean material. The toggle connection not only insures positive closure of the pickup members but may be also arranged to facilitate holding them in open position when applying a new wrapper. In such latter open arrangement, the control rod 52 may extend through the top of handle 22 and provided with a press button so that a thumb can press and move rod 52 downwardly past the toggle point.

A new bag may be readily replaced on the device for further use.

Thus, the illustrated sanitary and convenient, portable pickup device 1 for grasping, holding, transporting and depositing animal droppings and like unclean material avoids any direct contact by the user with the material collected. The only portion of the device which comes in direct contact with the material is readily and easily disposable. The illustrated disposable wrapper provides an inexpensive way of enveloping and handling unsanitary objects without contacting the user or other portions of the device. Objects of various sizes, shapes, configurations may be readily picked up because of the pliant bag material. Further, the device does not require the user to bend or stoop, but can be operated completely from a standing position, including the subsequent removal and replacement of the bag.

The illustrated bags 41 and pickup members 31 are economical and effective in operation, however, various other selected forms of holding means and pickup members may be utilized. Preferably at least one of the pickup members should be of open frame construction to permit the wrapper means to expand or extend outwardly to one side to accommodate the material which is picked up. Instead of bag-like wrappers, one or more sheets of compliant, disposable material may be used on the pickup means; the frame members may include means such as clamps, clips and the like for releasably retaining the wrapper means in the desired position on the members although this is not necessary when a pre-formed bag is used. In such modifications, sufficient play or leeway should be provided to permit reception of the collected material.

It would be possible to construct the pickup members 31 with means such as a transverse rod or portion intermediate its height to form a top or upper seal across the compliant panel portions 42 if they were not already sealed or if such an additional clamping seal were desired.

If desired, the device could be arranged to bias the pickup members into an open position, however, it is found convenient to have the members biased into the closed position to retain the material which has been collected without requiring any effort on the part of the user. Further, various other forms of springs or biasing means could be utilized, the lever might be replaced by various other mechanisms, and the arrangement of control arms and linkages might take various other specific forms. The illustrated structure does, however, provide a relatively simple and economical structure to manufacture, which provides little chance for malfunctioning and which is effective, strong, dependable and durable in operation.

Various other modifications or changes may be made in the illustrated structure without departing from the spirit and scope of the present invention.

I claim:

1. In a portable pickup device for grasping and transporting unclean material such as animal droppings and the like, said device having an elongated body provided with a handle at one end:
   pickup means carried at the other end of the body including a pair of pickup members in virtually parallel planes,
   said pair of pickup members including parallel bottom straight portions cooperable to move along a surface in close relation thereto whereby at least one straight portion is adapted to move beneath a dropping to be picked up,
   at least one of said pickup members being an open frame;
   means for moving at least one of the pickup members to and away from the other; and
   a disposable compliant wrapping means received and held on said pickup means with an opening at said bottom portions,
   the open frame pickup member being adapted to permit outward lateral displacement of said compliant wrapping means when a dropping is lifted by said straight portions of the pickup means for containing the dropping in said wrapping means at one side of the pickup means.

2. In a portable pickup device for grasping and transporting unclean material such as animal droppings and the like, said device having an elongated body provided with a handle at one end:
   pickup means carried at the other end of the body including a pair of pickup members,
   said pickup members including cooperable bottom portions adapted to be positioned along a surface for movement of at least one portion beneath a dropping,
   at least one of said pickup members being an open frame,
   and at least one of said pickup members being pivotally mounted with respect to the other of said pickup members;
   operating means for pivotally moving said pivotally mounted pickup member with respect to the other; and
   a disposable compliant bag with an open end portion, said bag being received between said pickup members,
   the bag open end portion being folded backwardly along the outside of said pickup members and providing an opening at said bottom portions, the open frame pickup member being adapted to permit outward displacement of the compliant bag when a dropping is raised above said bottom portions of the pickup members for containing the dropping within said bag and disposed at one side of the pickup members.

3. The portable pickup device of claim 2 additionally including spring means biasing said pivotally mounted pickup member toward the other for pressure engagement of the bottom portions to hold said bag and contents by said pickup members, said pressure engagement being relieved by said operating means when said bottom portions are separated for release of said bag and contents.

References Cited

UNITED STATES PATENTS

| | | | |
|---|---|---|---|
| 980,045 | 12/1910 | Bastian | 56—333 |
| 2,891,811 | 6/1959 | Strickler | 294—19 |
| 3,281,178 | 10/1966 | Fisher | 294—55 |

EVON C. BLUNK, *Primary Examiner.*

U.S. Cl. X.R.

294—115